UNITED STATES PATENT OFFICE.

MILTON T. J. OCHS, OF ALLENTOWN, PENNSYLVANIA.

PLASTER COMPOSITION.

SPECIFICATION forming part of Letters Patent No. 705,542, dated July 22, 1902.

Application filed September 28, 1901. Serial No. 76,888. (No specimens.)

*To all whom it may concern:*

Be it known that I, MILTON T. J. OCHS, a citizen of the United States, and a resident of Allentown, in the county of Lehigh and State of Pennsylvania, have invented a new and Improved Plaster Composition, of which the following is a full, clear, and exact description.

My invention relates to a plaster composition, more particularly for use in ordinary house-plastering on the inside or upon any ordinary surface used in building, although it can also be used outside with the best results.

One of the essential features of my invention is the mixture of a base of hydraulic cement and a dope containing water for setting the same—that is to say, I have discovered that hydraulic cement when hardened in air by means of an absorbent substance containing water and used as a plaster instead of a cement or mortar has superior qualities. The ordinary plasters used in buildings are of various kinds; but in all of the best plasters now used the principal ingredient is plaster-of-paris. It is found, however, that such plasters when used in the ordinary way in connection with brickwork present so-called "hard-working" qualities. None of said plasters are essentially hydraulic in their action.

I take silicate of aluminium—that is, ordinary clay—preferably of a good quality and reduce it to powder. I also take chalk and reduce it to a powder. By mixing these two substances in their powdered form I make a very effective dope, which will hold large quantities of water by absorption. I use these materials in their raw state, their function being merely that of an absorbent. I now take hydraulic cement of any approved kind, reduce it to a powdered form, and in its unslaked or "quick" state mix it with the ingredients above mentioned. These three ingredients thus mixed constitute my plaster.

It is found that the plaster is easily worked and can be easily made to cohere to almost any substance. It does not split or crack, and it avoids many objections heretofore encountered in plaster. The water used in slaking the cement is self-contained in the mixture, and it will harden as effectually as hydraulic cement will harden under water.

My plaster is handled like other plasters—that is to say, when mixing up for use certain proportions of sharp sand are added to the plaster, varying in quantity with the sharpness of the sand and the purpose for which it is to be used.

My plaster has practical working qualities which high-grade cements, such as Portland cement, do not possess. It will be seen, therefore, that I have produced a plaster suitable for houses and possessing many of the qualities of hydraulic cement, but slightly weaker than the same, and yet which is essentially a plaster like any other plaster and possesses working properties necessary in all good plasters.

Among the silicates of aluminium which may be used the best qualities are somewhat expensive. Kaolin, however, is comparatively cheap and may be used to considerable advantage.

I find that my plaster mixture can be applied to lathwork with the best results.

It should be noted that the silicate of aluminium and the chalk are not to be burned in with the cement, but are made up in the raw state and added to the cement after the latter is burned.

It may be noted that silicate of aluminium in the form of clay is not allowed to be used in either lime or cement mortars. Nevertheless I use them to great advantage in my plaster, for the reason that there is a wide difference between the strength required for mortars and for plasters. I have produced a composition which is harder and stronger than ordinary plaster and which will work like a plaster, but which is inferior in strength to hydraulic cement. The silicate of aluminium or the carbonate of lime may be used independently or may be mixed together to form the dope. I find that either of them makes a very good dope, but that a mixture of the two is better. Any desired proportions may be used, depending largely upon the purity and quality of the material. My preferred proportions, by weight, however, are as follows: hydraulic cement, (say Portland cement,) two parts; silicate of aluminium, (say kaolin,) one part; carbonate of lime, (say chalk,) one part; water sufficient to saturate the last-mentioned ingredients.

Having thus described my invention, I claim as new and desire to secure by Letters Patent—

1. A plaster, comprising hydraulic cement two parts, powdered silicate of aluminium one part and powdered carbonate of lime one part, all of the said substances being admixed together.

2. A plaster, comprising powdered hydraulic cement two parts, powdered silicate of aluminium one part, and powdered carbonate of lime one part, said silicate of aluminium and carbonate of lime being in a raw state saturated with water, and all of said powdered substances being admixed together.

In testimony whereof I have signed my name to this specification in the presence of two subscribing witnesses.

MILTON T. J. OCHS.

Witnesses:
   MILTON C. HENNINGER,
   R. L. SCHIFFERT.